United States Patent [19]
Focke et al.

[11] Patent Number: 5,881,533
[45] Date of Patent: Mar. 16, 1999

[54] PROCESS FOR ADJUSTING MACHINES

[75] Inventors: Heinz Focke; Harald Gosebruch, both of Verden, Germany

[73] Assignee: Focke & Co. (GmbH & Co.), Verden, Germany

[21] Appl. No.: 814,246

[22] Filed: Mar. 11, 1997

[30] Foreign Application Priority Data

Mar. 15, 1996 [DE] Germany .......... 196 10 092.5

[51] Int. Cl.⁶ .................................................. B65B 19/00
[52] U.S. Cl. .............................. 53/396; 53/167; 248/542; 248/550; 248/901
[58] Field of Search ........................... 53/167, 201, 396; 248/901, 550, 542, 543

[56]  References Cited

U.S. PATENT DOCUMENTS

| 3,026,607 | 3/1962 | McNulty . |
| 3,281,101 | 10/1966 | May . |
| 3,464,654 | 9/1969 | Kolesar . |
| 3,764,098 | 10/1973 | Dickinson . |
| 4,047,427 | 9/1977 | Young . |
| 4,135,392 | 1/1979 | Young . |
| 4,930,741 | 6/1990 | Young et al. . |
| 5,011,108 | 4/1991 | Chen et al. . |
| 5,360,195 | 11/1994 | Young . |

FOREIGN PATENT DOCUMENTS

| 0 294 732 A2 | 12/1988 | European Pat. Off. . |
| 0 467 562 A2 | 1/1992 | European Pat. Off. . |
| 38 40 070 A1 | 9/1989 | Germany . |
| 43 38 788 A1 | 5/1994 | Germany . |
| 44 30 251 A1 | 2/1996 | Germany . |

*Primary Examiner*—Daniel B. Moon
*Attorney, Agent, or Firm*—Abelman Frayne & Schwab

[57] ABSTRACT

The adjustment of machines (10) during the installation of the same at the location they are to be used is costly in terms of time and manpower, because a precise positioning of the machine is a precondition for a permanent fault-free operation. A reliably and precisely reproducible adjustment of the machine (10) is attained in that the load forces exerted on the machine feet (11) are measured and, by adjusting the machine feet (11), adapted to predefined nominal load forces (40). These calibration load forces are determined in advance, especially empirically, by using exact measurement methods. The values constitute reproducible values for the adjustment of the machine.

3 Claims, 4 Drawing Sheets

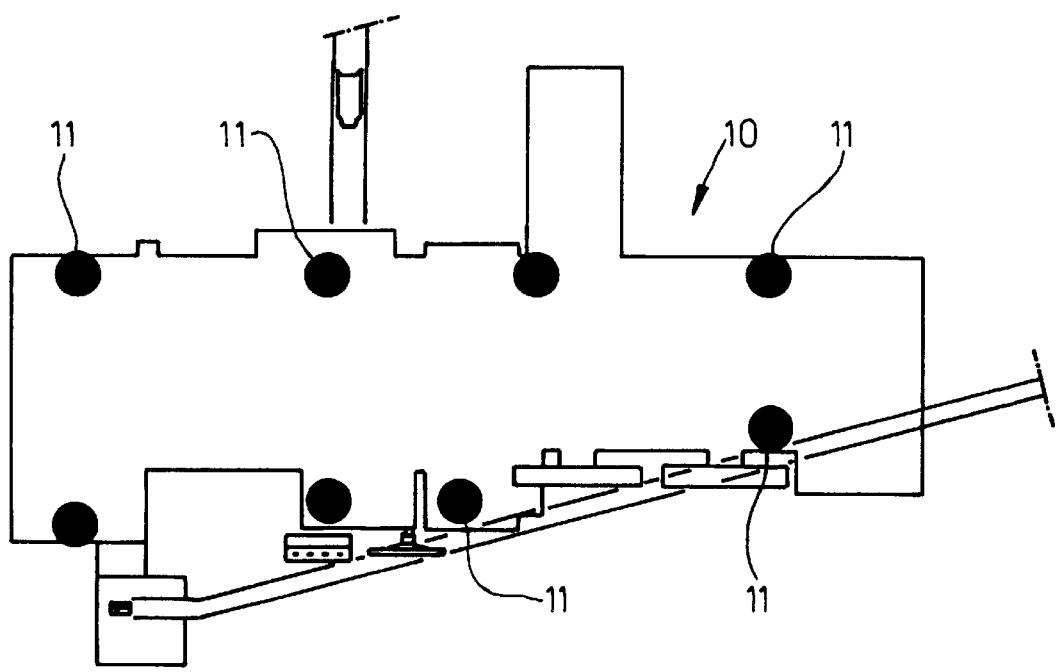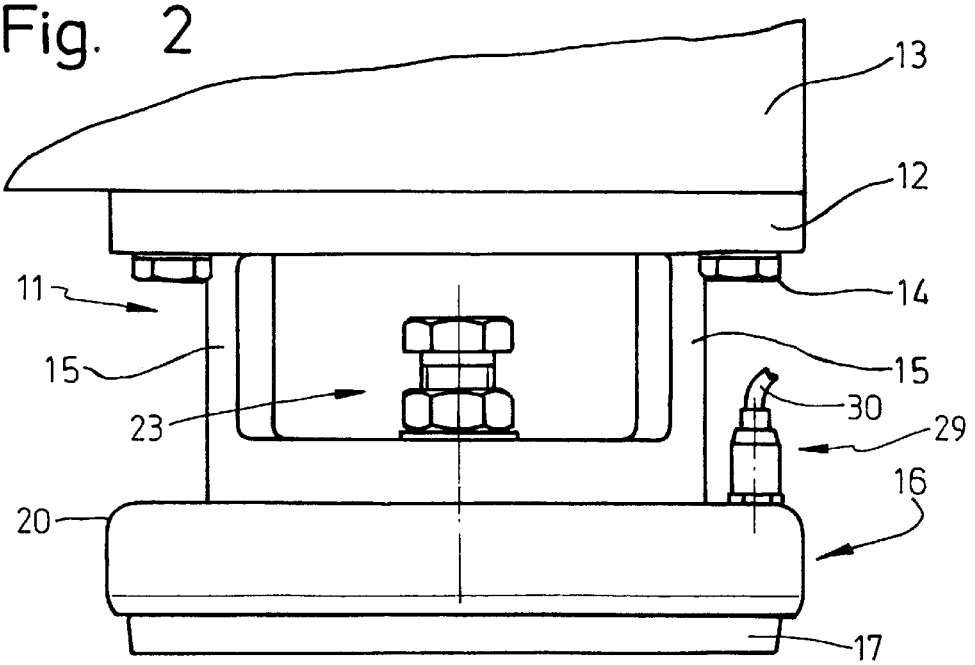

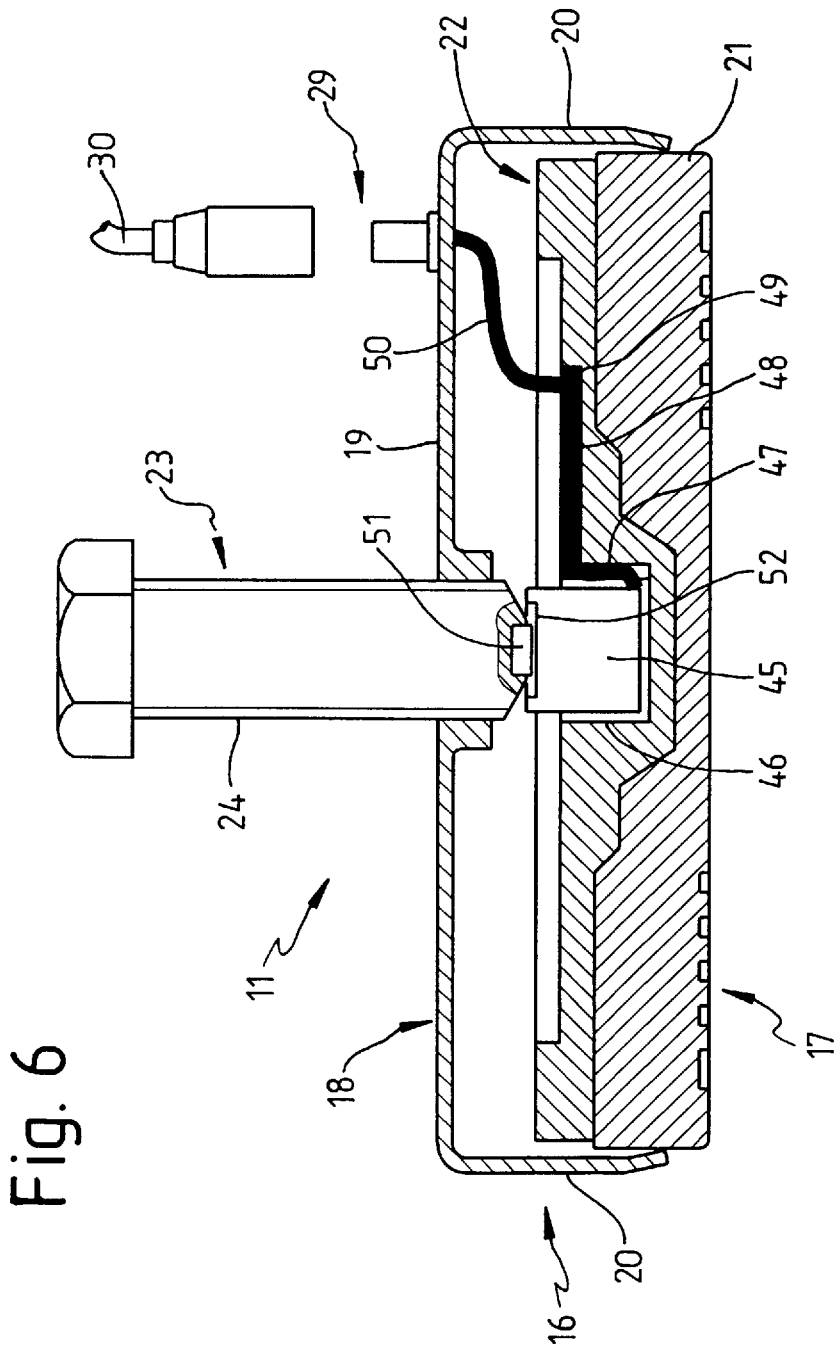

PROCESS FOR ADJUSTING MACHINES

BACKGROUND OF THE INVENTION

1. Field of the Invention

The invention relates to a process and an apparatus for adjusting machines, in particular packaging machines, which rest on a supporting surface with adjustable machine feet.

2. Description of the Related Art

Mounting and accurately adjusting machines requires considerable expenditure in terms of time and manpower, especially in the case of complex packaging machines. The machines rest on vertically adjustable machine feet. The precise adjustment of the machines is effectuated by adjusting the machine feet, the effort for the adjustment being considerable if the machine, due to its size, has a plurality of machine feet.

The object of the invention is to simplify the mounting and adjustment of machines and to attain greater precision therein.

SUMMARY OF THE INVENTION

To attain this object, the process according to the invention is characterized by the following features:
 a) optimum nominal load forces are set for every machine foot,
 b) the load forces actually exerted in the region of the machine feet are measured,
 c) in the case of deviations from the nominal load force, the machine foot is adjusted until the nominal load force is reached.

The invention is based on the finding that the machine feet are subjected to certain definite load forces if the machine is precisely adjusted, these load forces varying according to the positioning of the machine feet. Starting here, the load forces acting on every machine foot are determined during the adjustment of the machine. The machine foot is adjusted until a load corresponding to the correct adjustment is reached.

According to the invention, precise, optimum load forces are determined, at best empirically, directly in the machine factory for the manufacture of the respective machine. The nominal load forces are measured for each machine foot after precisely adjusting all machine parts. At the place the machine is installed, and thus in the factory, these nominal load forces are then again set according to the process according to the invention.

The process according to the invention is preferably used in conjunction with an apparatus in which the load forces are measured, digitized and evaluated on each machine foot by means of data processing. In a simple embodiment, the data can be supplied to a PC or laptop. According to the invention, the nominal load forces for each machine foot are stored therein. During the installation of the machine, the measured actual load forces are compared with the calibration values and altered until the nominal values for each machine foot have been reached. The nominal load forces and the contrasting actual values can be displayed numerically and/or graphically on a screen.

The monitoring of the machine feet may be continued either permanently or from time to time after a machine has been put into service at the location it is used. In the case of deviations which may occur during operation, the machine feet are re-adjusted after having reached a critical deviation.

Known load cells (transducers) or strain gauges are preferably used as pressure measuring members on the machine feet. The pressure measuring members are connected to an evaluation system via electrical lines.

BRIEF DESCRIPTION OF THE DRAWINGS

Further details of the invention will be explained hereinbelow in more detail with reference to an exemplary embodiment shown in the drawings. In these:

FIG. 1 shows a diagrammatic plan view of a (packaging) machine,

FIG. 2 shows a side view of a machine foot, on a heavily enlarged scale,

FIG. 6 shows a cross-section of a representation analogous to FIG. 3 for another exemplary embodiment of a machine foot.

DESCRIPTION OF THE PREFERRED EMBODIMENT(S)

Figure 3:
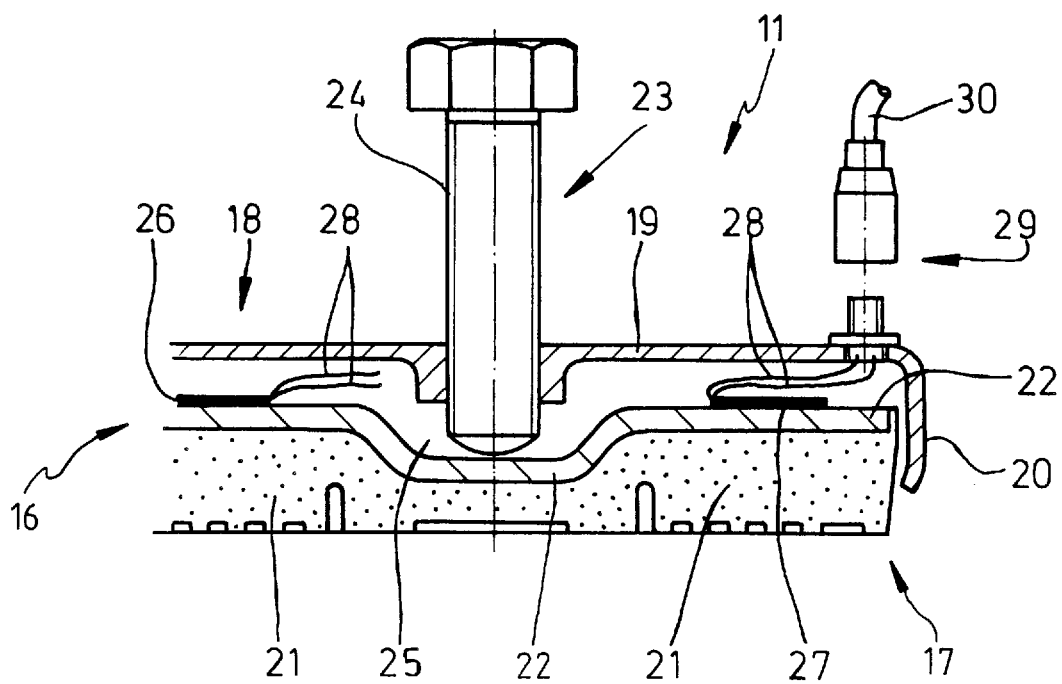
FIG. 3 shows a vertical section of the lower part of the machine foot according to FIG. 2.

The adjustment of machines is particularly difficult in the case of large packaging machines with a complex design. FIG. 1 shows the plan form of a packaging machine, specifically for the production of hinge-lid packs.

The elongate machine 10 is supported on the ground, for example on the floor of a hall, by several machine feet 11. In the present machine type altogether eight machine feet 11 are provided. The distribution of these machine feet 11 over the plan area of the machine 10 is chosen with respect to load characteristics which ensure a long-term smooth operation of the machine. The arrangement of the machine feet 11 results in different loads, namely load forces in the region of these machine feet. The occurring values lie between several 100 kg and more than 2000 kg per machine foot.

The load forces occurring in the region of the individual machine feet 11 are determined for an optimum position of the machine. These nominal load forces, which preferably have been determined in the machine factory for each machine foot 11, must be reached during the installation of the machine in the factory of the customer.

The machine feet 11 may be configured in different ways. According to FIG. 2, the machine foot 11 is fastened with screws to an upper anchoring plate 12 at the underside of the machine 10, namely a machine frame 13, 14. The anchoring plate 12 is connected to a foot portion 16 via a plurality of supports 15. This foot portion 16 rests on the ground, for example on the floor of a hall.

In the present example, the foot portion 16 is comprised of a (lower) base 17 for the support on the ground, and an upper cover 18. The latter is pot-shaped with a top wall 19 and a circumferential side wall 20. The latter partly surrounds the base 17, so that said base 17 immerses into the cover 18 with an upper part. The base 17 is comprised of a base portion 21 made from resiliently deformable material, particularly rubber. The top side of the base portion 21 is covered by a bearing plate 22. Base portion 21 and bearing plate 22 are fixedly connected to one another (FIG. 3 and FIG. 6).

The machine foot 11 is vertically adjustable. A central or centrally arranged setscrew 23 is provided for this purpose. The shaft 24 of this setscrew 24 passes through the cover 18 or the top wall 19 thereof with a thread. A lower end of the setscrew 23 is supported by the bearing plate 22, specifically in the region of a central depression 25 (FIG. 3).

For the vertical adjustment, base 17 and cover 18 can be moved towards one another in a telescopic manner by means of the setscrew 23. The base 17 is downwardly extendible by turning the setscrew 23 in one direction, as a result of which the machine 10 is raised in this region. The machine 10 can be locally lowered by a reversed direction of rotation of the setscrew 23. Thereby, the distance between top wall 19 and bearing plate 22 is altered.

The load acting on the machine foot 11, namely the load or supporting force, is measured by the present system. To this end, measuring members are arranged, in the exemplary embodiment of FIG. 3, on parts of the machine foot 11 which are deformed by the load forces. According to FIG. 3, strain gauges 26, 27 are arranged on the bearing plate 22, specifically at the top side thereof. These sensors react on alterations of the bearing plate 22 due to changes in load, and thus to alterations of the effective load force. Expediently, a plurality, for example two or four such strain gauges 26, 27 are connected to the bearing plate 22 is distributed positions.

Strain gauges 26, 27 are sensors known per se which convert deformation into changes in electrical resistance. The change in electrical resistance is a signal for the load force exerted in the region of the machine foot 11. The measurands of the strain gauges 26, 27 are supplied to an evaluation system (FIG. 4 and FIG. 5) via electrical lines 28. To this end, the machine foot 11 is provided with an electrical connection in the region of the cover 18. This is comprised, in the present case, of a plug-and-socket connector 29 arranged on the top wall 19. The lines 28 of the strain gauges 26, 27 lead to this plug-and-socket connector 29. For carrying out the adjustment process, a connection cable 30 is connected to each machine foot 11 of the machine 10. The connection lines 30 of the machine feet 11 lead to the common evaluation system.

The measurement results on the machine feet 11 are processed by the evaluation system and displayed for the operating personnel. The evaluation system is configured as a transportable device which is connected to the machine 10 via plug-and-socket connectors 29 at the location the machine is used. In the present exemplary embodiment, a display member forms part of the evaluation system for the visual display of the measurement values. In the present case, a screen 31 is assigned to the evaluation system, in particular as a part of a PC or laptop 32.

Figure 4:
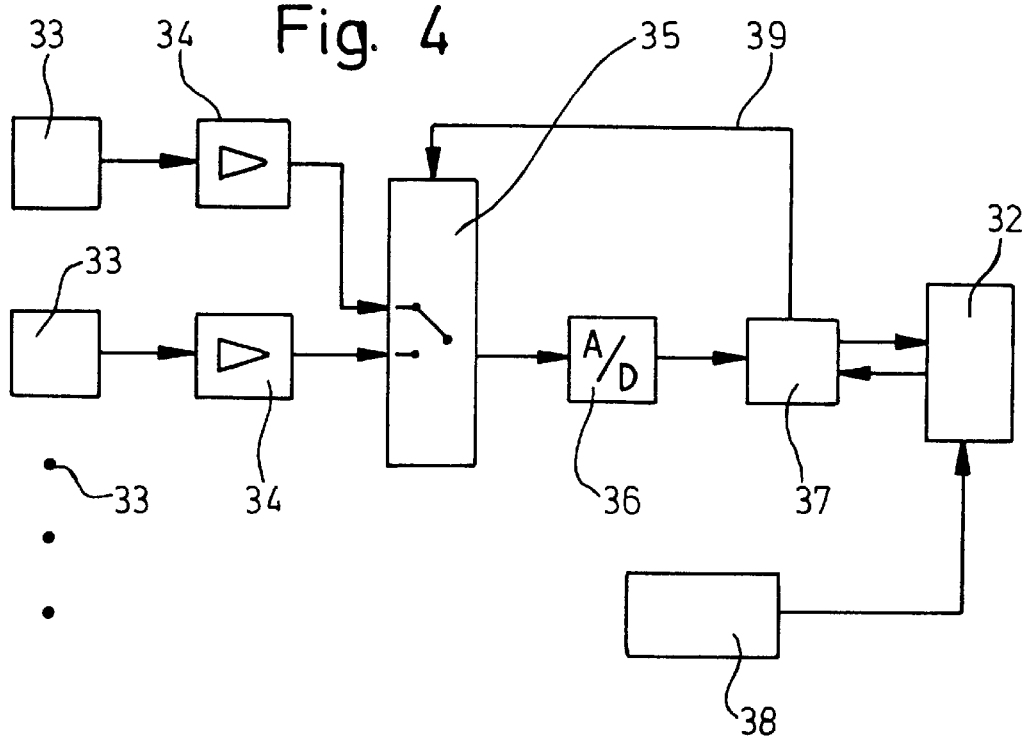
FIG. 4 shows a circuit diagram of an evaluation system.
Figure 5:
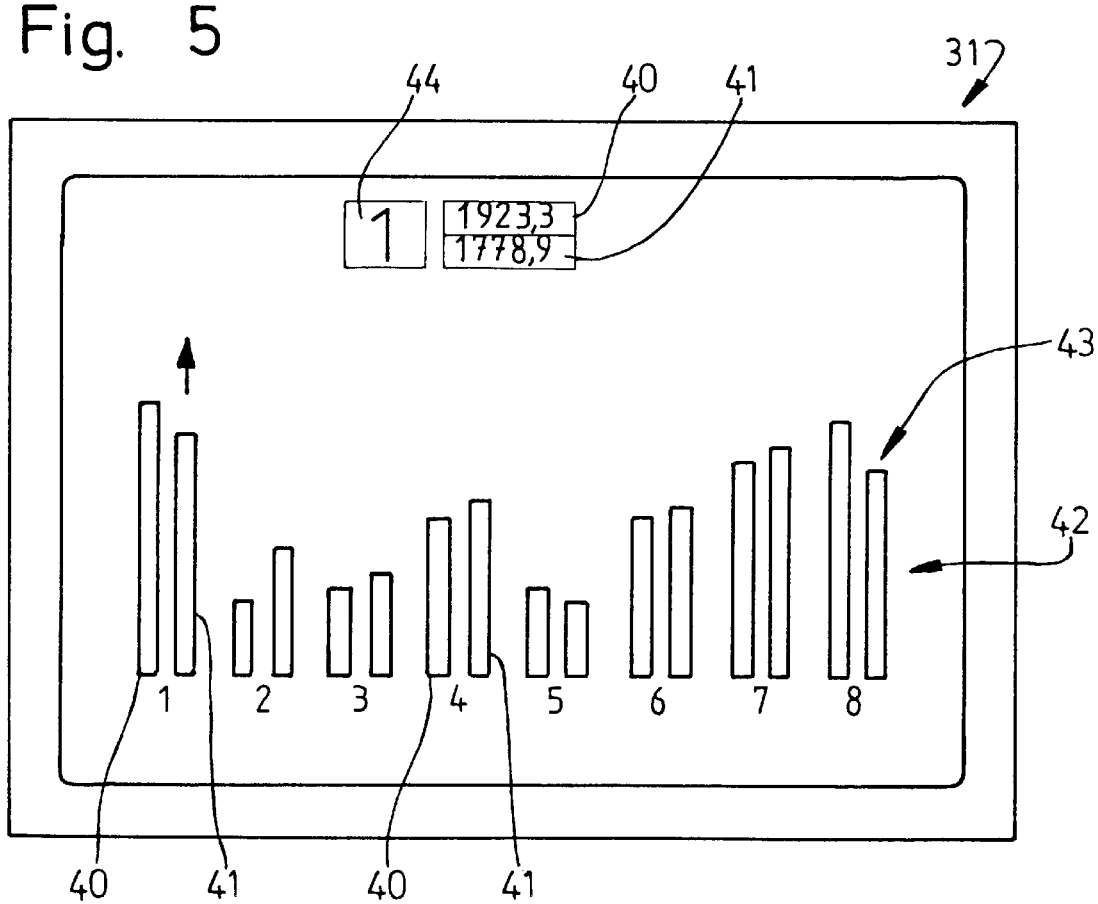
FIG. 5 shows a screen with data as a member of the evaluation system according to FIG. 4.

The electrical signals received from the strain gauges 26, 27, namely the voltages altering with respect to the changes in load, are processed according to the example of FIG. 4. According thereto, each machine foot 11 is assigned a bridge circuit 33. This bridge circuit 33 conducts the signal of the respectively measured machine foot 11 to a switching member, namely a multiplexer 35, via a (voltage) amplifier 34. The multiplexer 35 effectuates the switching in of the individual machine feet 11, which are checked and adjusted in succession or in a sensible order by means of the multiplexer, until every machine foot 11 displays the predefined nominal load force.

The signals emitted by the multiplexer 35 are converted into digital signals by an analog-to-digital converter 36. Then, these digital signals are prepared for being processed in the laptop 32 in the region of an interface 37.

A further peculiarity of the evaluation system consists in that the individual machine 10, or all corresponding types of this machine embodiment, are assigned empirically or otherwise determined nominal load forces. These "calibration values" are stored in a memory 38, which is connected to the laptop 32 as an operating member of the evaluation system. Now, the individual machine feet 11 can be read out by means of the laptop to determine the actual load force, specifically via a control line 39 which leads from the laptop 32 via the interface 37 to the multiplexer 35. After determining the actual load force, the machine foot 11 in question is adjusted for leveling to the nominal load force, in the present case by actuating the setscrew 23. This adjustment process is carried out for all machine feet 11 until the nominal load forces are reached.

The display of the load forces on the screen 31 may take place in different manners. In the present example according to FIG. 5, the nominal load forces 40 and the actual load forces 41 are displayed numerically, one the one hand, specifically as a measured digit in kilograms. Furthermore, these results are also displayed graphically, in the present case as vertical bar charts 42. One pair of bars 43 is provided for each machine foot 11. Of these bars, one shows the predefined nominal load force, and the other the measured actual load force 41. This actual load force 41, or this bar, is altered during the adjustment of the machine foot 11, until they are in level. The respectively adjusted machine foot 11 is displayed in numeric field 44.

A particularly advantageous embodiment of a machine foot 11 is shown in FIG. 6. On the bearing plate 22, which takes the form of a molded part, there is arranged a pressure measuring member, namely a load cell 45, which is expedient for this purpose. This load cell is a measuring member which is known per se. A load cell 45 or a sensor of the company Hottinger Baldwin MeBtechnik with an output voltage of 0–5 V, corresponding to a maximum load of 2000 kg, is advantageous.

The load cells 48 are measuring members which are directly subjected to pressure, in the present case by the setscrew 23. The changes in pressure are exactly measured and converted into an electrical signal by the load cell 45. This electrical signal is supplied to the evaluation system.

The load cell 45 is positively positioned in a recess 46 in the middle of the circular bearing plate 22. In the region of the recess 46, the load cell is adjoined by an electrical line 47. This line 47 leads to an amplifier 48 which is, consequently, an integral part to the machine foot 11. The amplifier 48 positively sits in a radially extending depression 49 of the bearing plate 22. An electrical line 50 leads from the amplifier 48 to the plug-and-socket connector 29 on the cover 18.

At the lower end, the setscrew 23 is configured in a special manner, namely provided with an inserted, especially adhesively bonded pressure piece 51 made from cured material, namely hard metal. The setscrew 23 is supported with this comparatively small pressure piece 51 on the top side of the load cell 45. This load cell 45 is provided with a hardened stop face 52 in this region.

The adjustment of the machine feet 11 according to the measured or compared load forces may also be carried out by means of other actuating members (in replacement of setscrews 23), for example by a servomotor, without manual intervention. This servomotor may be permanently arranged on each machine foot 11, and the evaluation system may be controllable. An automatic adjustment of the machine feet 11 may be alternatively carried out by bimetals, which are alterable under electricity and, therefore, may be used as members for raising and lowering.

We claim:

1. A process for adjusting a packaging machine (10) for cigarettes, said packaging machine resting on a supporting surface with adjustable machine feet (11), said process comprising the following steps:

a) predetermining at the place of production of the machine (10) an optimum or nominal load force (40) for each machine foot (11) based upon empirical measurement;

b) storing the nominal load forces (40) in central evaluation equipment;

c) measuring an actual load force (41) occurring in the region of each machine foot (11) at the place of installation of the machine (10);

d) comparing the actual load force (41) with the nominal load force (40) for each machine foot;

e) adjusting each machine foot (11) until the nominal load force (40) is reached for each machine foot (11) for which the actual load force (41) is different than the nominal load force (40); and f) returning to step c) at the choice of a user of the packaging machine (10).

2. A process as claimed in claim 1, further comprising the step of visualizing the nominal load forces (40) and the actual load forces (41) by digitizing the values of the nominal load forces (40) and the actual load forces (41) and transmitting the values to a screen (31) of a personal computing device (32).

3. A process as claimed in claim 2, wherein the nominal load force (40) and the actual load force (41) are graphically displayed for each machine foot (11) on the screen (31).

* * * * *